United States Patent [19]
Radek

[11] 4,247,144
[45] Jan. 27, 1981

[54] STORAGE DEVICES FOR SERVICE TRUCK

[75] Inventor: John R. Radek, Hinsdale, Ill.

[73] Assignee: Ready Metal Manufacturing Company, Chicago, Ill.

[21] Appl. No.: 73,696

[22] Filed: Sep. 10, 1979

Related U.S. Application Data

[62] Division of Ser. No. 824,640, Aug. 15, 1977, which is a division of Ser. No. 632,625, Nov. 17, 1975, Pat. No. 4,056,194, which is a division of Ser. No. 418,835, Nov. 26, 1973, Pat. No. 3,957,159, which is a division of Ser. No. 240,163, Mar. 31, 1972, Pat. No. 3,807,788.

[51] Int. Cl.³ .............................................. B60R 11/00
[52] U.S. Cl. .................................. 296/24 R; 211/126; 211/181
[58] Field of Search ............. 296/24 R, 3; 211/126 X, 211/106, 181 X

[56] References Cited

U.S. PATENT DOCUMENTS

| | | | |
|---|---|---|---|
| 1,473,850 | 11/1923 | Greene | 296/24 R |
| 3,295,471 | 1/1967 | Cook | 211/106 |
| 3,300,056 | 1/1967 | Kasper | 211/181 |
| 3,791,528 | 2/1974 | Brendgord | 211/126 |

Primary Examiner—Robert R. Song
Attorney, Agent, or Firm—Frank H. Marks

[57] ABSTRACT

Storage devices designed primarily, though not exclusively, for mounting in a storage van for tools, supplies and other materials required by the service man in the course of his calls, consisting of baskets or like containers of knockdown construction, preferably formed essentially of wire for quick and easy access and visibility, supported largely by ceiling and floor and capable of quick and easy mounting and detachment. Such containers are stacked vertically, so as to make the most efficient utilization of space and may be bodily removed if desired.

4 Claims, 6 Drawing Figures

U.S. Patent  Jan. 27, 1981  Sheet 2 of 2  4,247,144
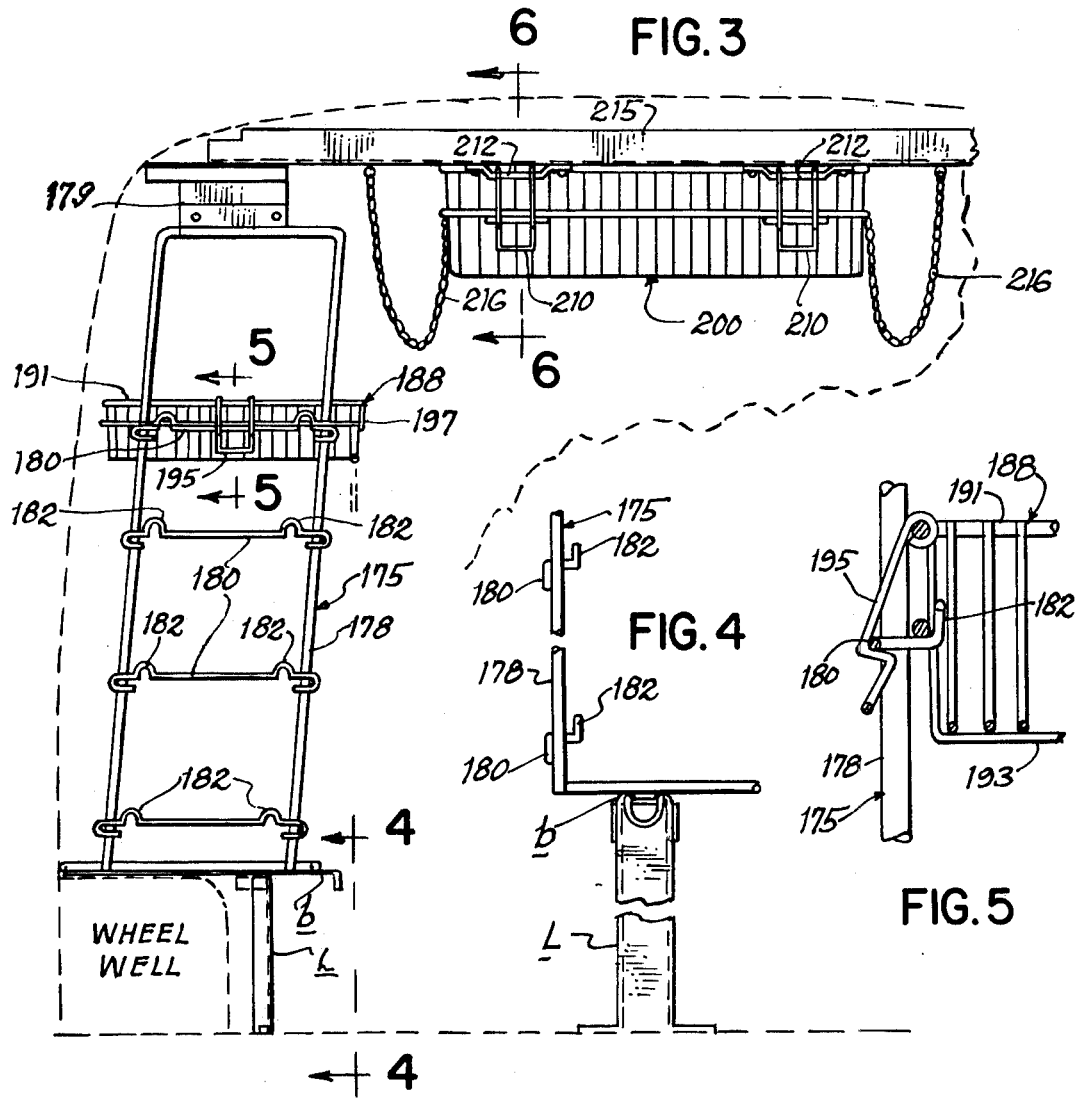
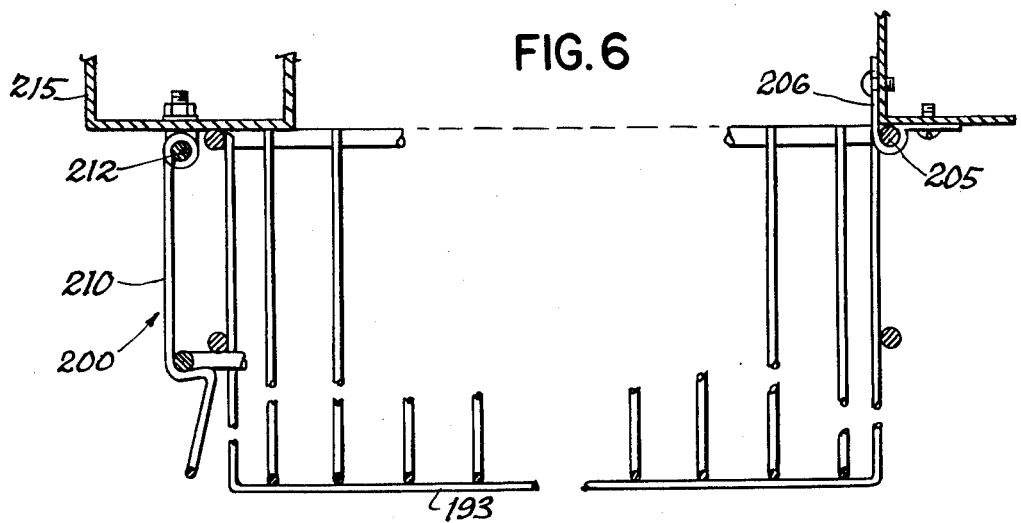

STORAGE DEVICES FOR SERVICE TRUCK

This application is a division of application Ser. No. 824,640, filed Aug. 15, 1977, which in turn is a division of Ser. No. 632,625, filed Nov. 17, 1975, now U.S. Pat. No. 4,056,194, issued Nov. 1, 1977, which in turn is a division of Ser. No. 418,835, filed Nov. 26, 1973, now U.S. Pat. No. 3,957,159 issued May 18, 1976; the latter in turn is a division of Ser. No. 240,163, filed Mar. 31, 1972, now U.S. Pat. No. 3,807,788 issued April 30, 1975.

My primary invention relates to a van for servicemen with a variety of equipment disposed therein to house and dispense tools and materials needed in service calls. My prior applications claim various features of the invention such as certain specialized material holding and dispensing equipment.

The present application is particularly directed to stationary containers designed to be mounted in and supported by the van.

BACKGROUND

The art is replete with a wide variety of baskets and like containers for holding and dispensing small items, some such containers formed of wire, as in my invention. The most pertinent of said art is of record in my prior applications and patents above referred to.

BRIEF OUTLINE OF INVENTION

This divisional application concerns baskets of the character referred to specially designed to be mounted in and supported by the body of a service van, though not necessarily so. They are preferably formed of reticulated wire. When mounted in a service van, they are preferably mounted adjacent a rear door for easy access from outside the van body. The containers are designed for high visibility and accessibility, contributing to the serviceman's efficiency.

Various other objects and advantages will become apparent to those skilled in the art as the description proceeds.

BRIEF DESCRIPTION OF DRAWINGS

Referring now to the drawings forming part of this specification and illustrating certain preferred embodiments.

FIG. 3 is an elevational view on an enlarged scale of a portion of the storage compartment of the truck body, showing certain storage equipment mounted therein;

FIG. 4 is an enlarged fragmentary elevation seen along line 4—4 of FIG. 3;

FIG. 5 is a similar view seen along line 5—5 of FIG. 3; and

FIG. 6 is an enlarged fragmentary section-elevation taken substantially along line 6—6 of FIG. 3.

DETAILED DESCRIPTION

Figure 1:
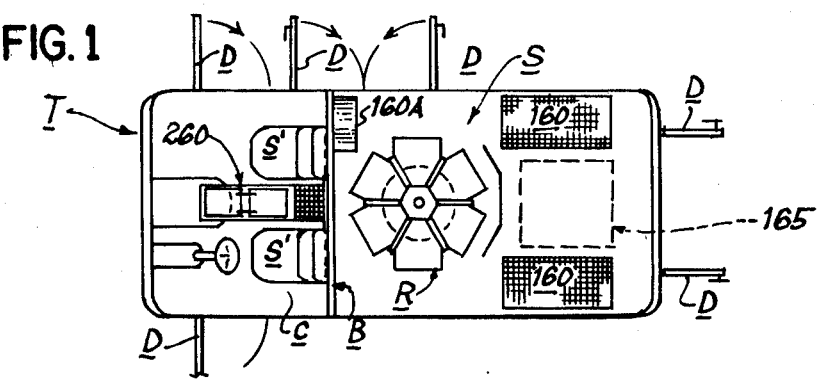
FIG. 1 is a schematic top plan view of a fitted truck body in a preferred embodiment of my invention, designed to house my improved storage devices.
Figure 2:
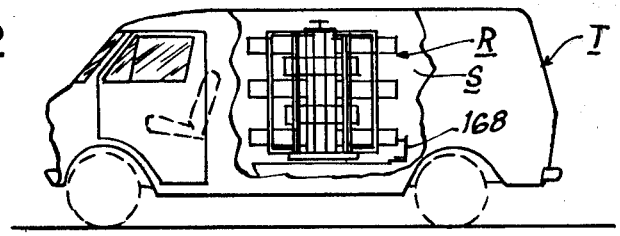
FIG. 2 is a side elevation of the van of FIG. 1, with parts of its side walls cut away to reveal certain interior equipment.

Referring first to FIGS. 1 and 2, my invention contemplates a specially equipped truck body T which may be the body of a standard or modified panel van designed to facilitate and expedite the functioning of servicemen, as outlined hereabove. It will be understood that my invention is otherwise applicable to the cabin of a nautical vessel, etc. In fact, various aspects of my invention are widely applicable, as in stationary installations, although specially designed for moving vehicles.

Truck body T comprises essentially two main compartments, viz., cab portion C and storage compartment S, said compartments being separated by a bulkhead B, preferably.

Removably mounted in the cab portion and storage compartment, respectively, are various storage and dispensing devices as will hereinafter be described.

STATIONARY STORAGE DEVICES

As seen in FIG. 1, available space within the storage portion S of the truck body is utilized by provision of stationary storage and dispensing units 160, 160 disposed adjacent the side walls and a unit 165 supported by the roof. All of said units are preferably of knockdown construction designed for easy mounting and detachment.

As seen in FIGS. 3–6, conveniently positioned adjacent a side wall is a frame 175 comprising legs L bolted to the floor, to which legs are attached transverse bars b defining the ends of the frame. Mounted on bars b is a pair of upstanding U-shaped wire members 178 secured to the roof as by straps 179 and spaced lengthwise of the truck.

Extending between the legs of each U-member 178 and fixed thereto as by brazing or welding is a series of vertically spaced horizontal container supports 180, preferably of wire. Said supports are provided with elements such as integral loops 182 for limiting movement of a basket 185, as hereinafter described in further detail.

The side containers may take a variety of forms. A preferred basket 188 formed of wire comprises a top rim element 191 having back and side members, the front being open. Wires secured to rim 191 form three sides and a bottom grid 193. A bail-like clamp 195 hingedly attached to the side portions of rim 191 clampingly engages support wires 180, cooperating with loops 182 to limit outward and rearward displacement of the basket.

The front of the basket is provided with a gate member 197 pivoted at the bottom to drop and retained in closed position by any suitable means, which may be similar to containers described and claimed in my parent applications noted hereabove.

A ceiling container 200 may also be provided, a preferred form of which is seen in FIGS. 3 and 6, formed of wire and having four sides and a bottom of lattice form. Basket 200 may be pivotally attached by a rear rim portion 205 to a suitable bracket 206 on the roof of the truck body, the basket front being detachably connected by a bail 210 or the like pivotally attached as at 212 to a support 215 fixed to the roof. Downward displacement of basket 200 is limited by a flexible member 216 (FIG. 3).

It will be understood that other types of storage and dispensing units may be provided, such as chests, cabinets, etc., in any case secured against displacement in truck transit and arranged for convenient access.

CONCLUSION

Various changes coming within the spirit of my invention may suggest themselves to those skilled in the art. Hence, I do not wish to be limited to the specific forms shown or uses mentioned, except to the extent indicated in the appended claims.

I claim:

1. Storage equipment for loose articles, comprising
   a. a pair of horizontally spaced, opposed end frames, each comprising a front post and a back post,
   b. a plurality of vertically spaced stringers rigidly connecting each of said front posts with its adjacent back post to provide pairs of horizontally spaced, opposed stringers, each having container retaining means, and
   c. a container carried by each pair of opposed stringers, said container having clamp means cooperating with said retaining means to detachably secure it to said stringers.

2. A combination as in claim 5, wherein said elements are formed essentially of wire,
   a. said end frames each comprising an inverted U-member,
   b. each stringer having an integral deformation intermediate its ends, constituting said retaining means.

3. In a combination as in claim 6,
   a. a plurality of vertically spaced pairs of opposed stringers, and
   b. a plurality of containers supported by each of said pairs of opposed stringers, said containers being disposed in vertically stacked relation.

4. Storage equipment as in claim 5 in combination with a service van having a storage compartment in the rear portion thereof and having rear access doors, said equipment being mounted detachably in the rear portion adjacent said doors.

* * * * *

UNITED STATES PATENT AND TRADEMARK OFFICE
CERTIFICATE OF CORRECTION

PATENT NO. : 4,247,144

DATED : January 27, 1981

INVENTOR(S) : John R. Radek

It is certified that error appears in the above—identified patent and that said Letters Patent is hereby corrected as shown below:

Claim 2, line 1, "claim 5" should read -- claim 1 --.

Claim 3, line 1, "claim 6" should read -- claim 2 --.

Claim 4, line 1, "claim 5" should read -- claim 1 --.

Signed and Sealed this

Fourth Day of August 1981

[SEAL]

Attest:

Attesting Officer

GERALD J. MOSSINGHOFF

Commissioner of Patents and Trademarks